March 25, 1941.   F. W. TURNBULL   2,235,855
ICE CREAM CONE DISPENSER
Filed Feb. 4, 1933   3 Sheets-Sheet 2
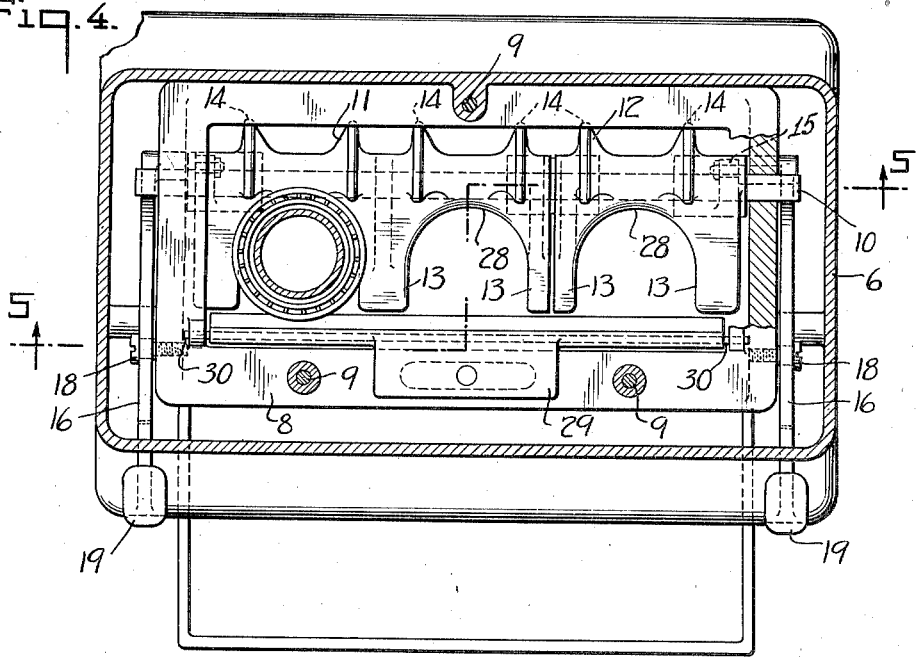
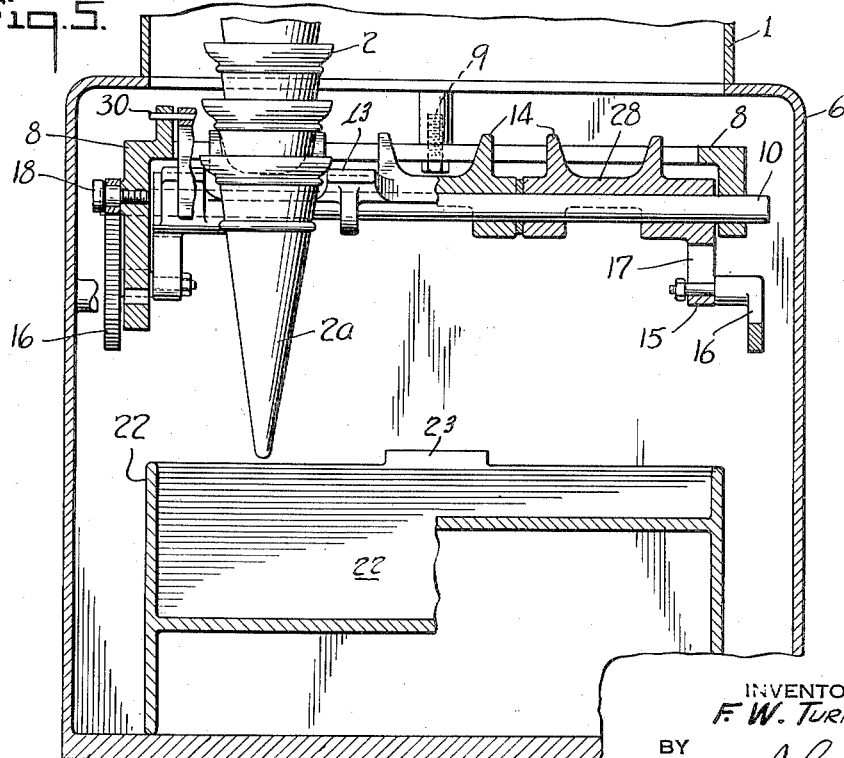
INVENTOR
F. W. TURNBULL
BY
Henry Savage
ATTORNEY March 25, 1941.    F. W. TURNBULL    2,235,855
ICE CREAM CONE DISPENSER
Filed Feb. 4, 1938    3 Sheets-Sheet 3
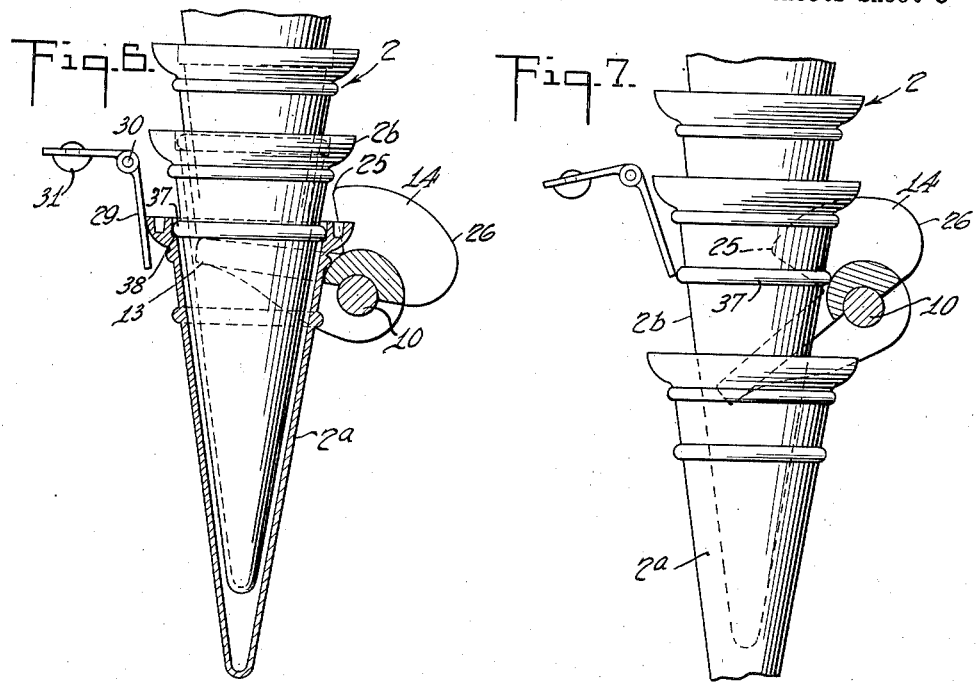
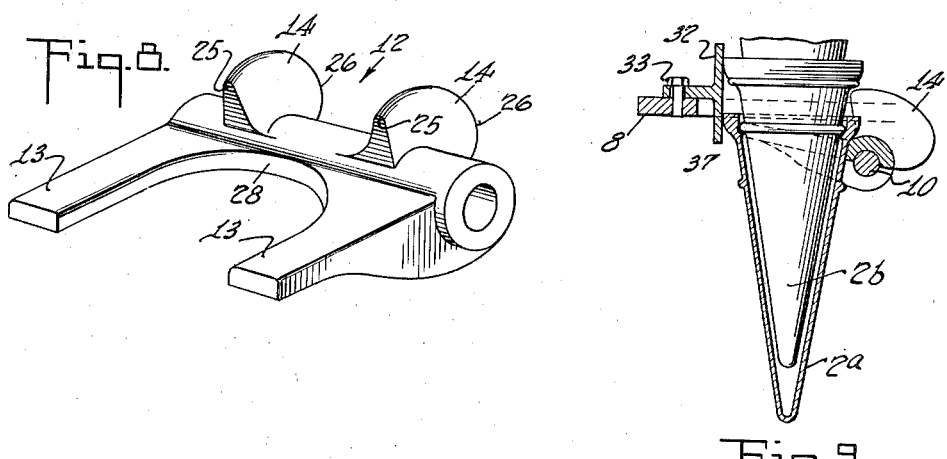
INVENTOR
F. W. TURNBULL
BY
Henry J. Savage
ATTORNEY Patented Mar. 25, 1941

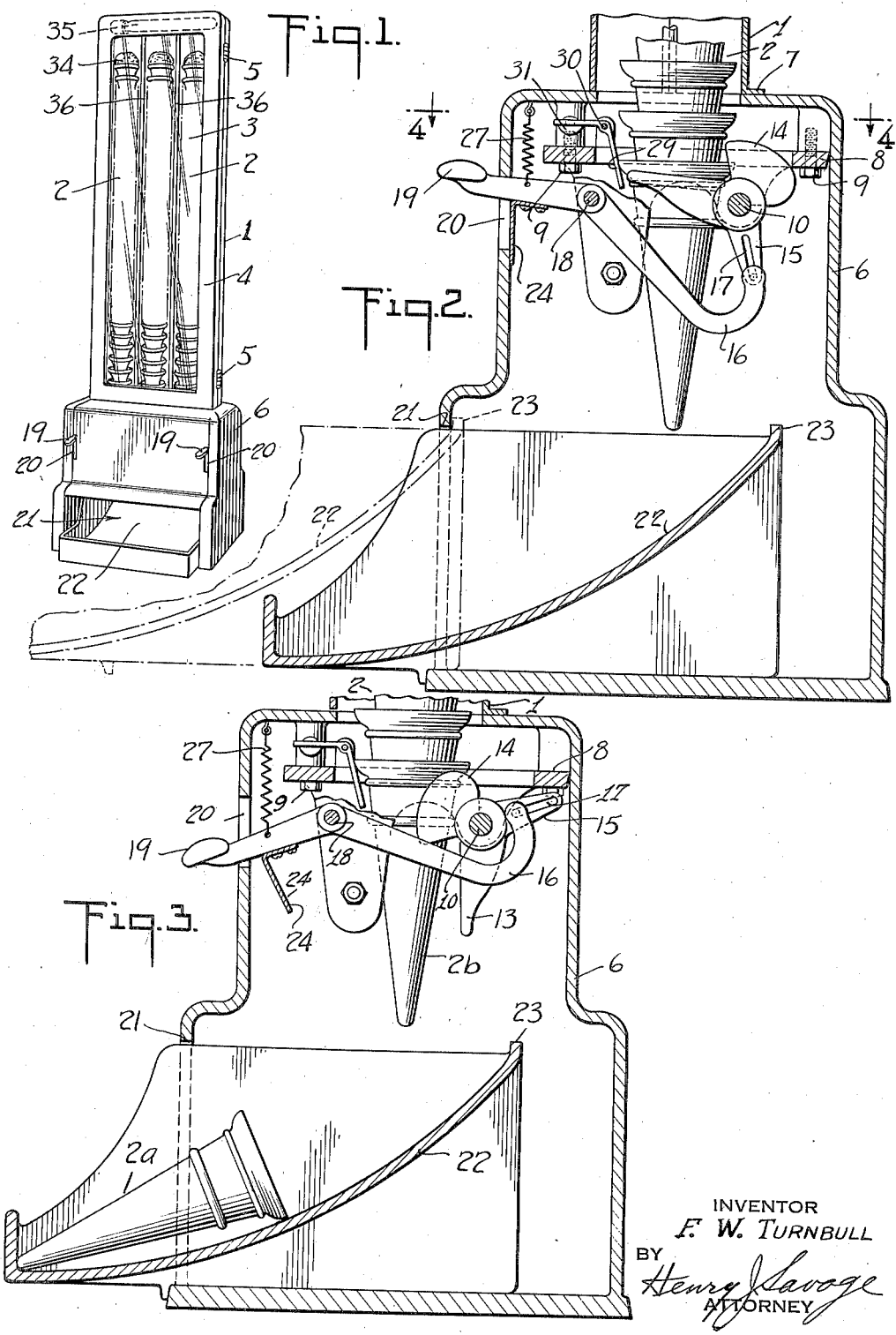

2,235,855

UNITED STATES PATENT OFFICE 2,235,855

ICE CREAM CONE DISPENSER

Francis W. Turnbull, Chattanooga, Tenn.

Application February 4, 1938, Serial No. 188,616

5 Claims. (Cl. 312—44)

My invention relates to ice cream cone dispensers and among its many objects and advantages are to produce a dispenser for ice cream cones that is of low cost, reliable in its operation, completely protects the cones from contamination, keeps them dry and crisp, dispenses one or a multiple of cones as the operator desires, displays the cones to advantage, is itself a decorative fixture, dispenses the cones without breakage or other loss, is easy to fill and always shows just how many cones it contains. Many attempts have been made heretofore to provide some means for holding and dispensing ice cream cones but all of them have been unsatisfactory or defective in one or more essential features among which are; they have been hard to fill with cones, and hard to get the cones out, the cones will break when being removed, they take up too much room on the counter or at the fountain, no means is provided to keep the cones crisp, cones are exposed to the air and become tough, they are hard to clean. All the disadvantages of prior dispensers are overcome in the present invention and in the drawings I have illustrated one embodiment wherein, Fig. 1 is a perspective view of a dispenser holding three "sticks" or stacks of ice cream cones.

Fig. 2 is a vertical section through the base of the dispenser showing the ejecting mechanism in normal or active position.

Fig. 3 is a view similar to Fig. 2 showing the ejecting lever pressed down and a cone dropped into the delivery chute.

Fig. 4 is a horizontal section taken substantially on the line 4—4 of Fig. 2, but with the ice cream cones removed from the two right hand stacks.

Fig. 5 is a section taken substantially on the off-set line 5—5 of Fig. 4.

Fig. 6 shows how the stack of cones normally is held in the dispenser.

Fig. 7 shows the lower cone just before being released from the stack.

Fig. 8 shows one part or section of the spool.

Fig. 9 shows a modified form of guide for the cones.

In the form of my invention illustrated in the drawings, my improved dispenser consists of a cabinet having an upper section 1 in which a number of stacks of ice cream cones 2 are supported in vertical position and displayed through the glass front 3 which is connected in a swinging door 4 hinged to the back of the upper section at 5. This upper section is secured to the lower section 6 in any suitable manner, as by flanges 7, and in the lower section the operating mechanism of the dispenser is mounted. The operating mechanism preferably is mounted on a removable frame 8 which is secured in any suitable manner, as by screws 9, within the lower section 6. The frame 8 is an open frame so as to permit the cones to pass through it and on one side a shaft 10 is mounted to support a two-part spool or holder 11, 12, each part of which has one or more forks 13 and pairs of rounded noses or short forks 14 which are operated to deliver the ice cream cones one at a time from the bottom of the stacks 2.

Each of the sections of the cone holder or spool has a depending arm 15 to which one end of an operating lever 16 is connected, as by a slot and pin connection 17. The lever 16 is pivotally mounted at 18 on the frame 8 and its free end 19 extends through a slot 20 in the lower casing member 6. There will be as many of the levers 16 as there are sections 11 and 12 to the cone holder.

The lower casing member 6 has an opening 21 in its front face near the bottom in which the removable cone delivery tray 22 is slidable. This cone delivery tray or chute when in its inner position, as shown in Fig. 3, receives the cones discharged from the stack and its forwardly curved bottom delivers them at the open front where they can readily be picked up by the operator. When in its outer position, as shown by dotted lines in Fig. 2, this cone chute has an abutment 23 which abuts against the inner surface of the lower casing member inside the opening 21 and closes this opening so that dust, dirt and vermin may not enter the dispenser. The slot 20 of course is much wider or deeper than the operating lever 16 and in order to close this slot so that nothing can enter the containers through it, I provide a closing plate 24 which may be attached to the operating lever, as shown in Fig. 2, to shut off this slot when the lever is in normal or inactive position.

As best shown in Fig. 6, the bottom cone 2a of the stack is engaged on opposite sides near its top by the forks 13 which support the entire stack of cones. When the lever 19 is depressed it turns one section of the holder 11, 12 on the shaft 10 swinging the fork 13 downward to release the bottom cone. As the fork 13 is turned downward the rounded noses 14 are turned in under the enlarged mouth of the next cone 2b above the bottom so that all of the cones above the bottom one are supported by these noses. These noses are rounded, the engaging surfaces from the point 25 to the point 26 being substantially concentric with the axis of the shaft 10. Thus as the point 25 comes into engagement with the cone 2b to support the stack, continued rotation of the noses does not raise or lower the stack because the engaging surface is concentric with its axis of rotation. This is clearly shown in Fig. 7.

When the fork 13 has been turned to discharge position, as shown in Fig. 3, the lower cone 2a drops off on to the chute 22 and the rest of the stack is held in position in the dispenser by reason of the engagement of the noses 14 with the cone 2b which now becomes the bottom cone of the stack. When the lever 19 is returned by the spring 27 to its inoperative or normal position, the forks 13 straddle and engage the cone 2b to support the stack as the noses 14 are turned back out of engagement with this cone.

The stacks of cones are supported in the dispenser solely by the forks 13 and noses 14 and in order to insure that the cones will maintain their proper position, the portion 28 of the spool or holder between the noses 14 serves as a guide for the stack of cones on one side while on the opposite side I provide a guide 29 which may be pivoted at 30 to the frame 8 and counter-balanced by a weight 31, as shown in Figs. 2, 3 and 6. In some instances this guide member may be a rigid plate 32 which is adjustably mounted at 33 upon the frame 8 as shown in Fig. 9. The guide 29 is pivotally mounted and the guide 32 adjustably mounted on the frame so that ice cream cones of different diameters may be dispensed from the container.

In order to be sure that the stacks of cones are fed to the dispensing mechanism and also to increase the attractiveness of the dispenser I may provide light weights 34 (Fig. 1) which preferably are made from some moldable material, as plaster of Paris, in the form of servings of ice cream and colored to represent the different flavors and are placed in the top cones of the stack. These weights are not heavy enough to crush the ice cream cones but do insure the descent of the stack as the cones are dispensed from the bottom.

In order to keep the cones crisp in the display and also to add to its attractiveness, I may place an electric light bulb 35 at a suitable place in the cabinet so as to illuminate it and also slightly heat it and keep the cones crisp. Also the rods 36 which separate the stacks of ice cream cones may be neon light tubes of any suitable color, which will not only add to the attractiveness of the dispenser but also furnish a slight amount of heat to further assist in keeping the cones crisp and fresh. Either or both of the lighting and heating devices 35 and 36 may be used.

It is to be noted that I have illustrated a dispenser having three stacks of ice cream cones but these dispensers may be made of any desired capacity. In the present instance I also divide the spool or holder into two sections 11 and 12, the two sections being independently operated by the two levers 19. The section 12 has but one fork 13 so that when it is actuated it delivers a single cone into the chute 22. The section 11 of the spool has two forks 13 engaging the bottom cone of two stacks so that when it is actuated it delivers two cones, one from each stack. By actuating both levers 19 at the same time the operator will deliver three cones. It will thus be seen that I have arranged my dispenser so that either one, two, or three cones may be delivered at each operation. Of course if the dispenser is made larger to contain more than three stacks of ice cream cones, the spool may be divided so as to deliver the cones in any desired number. Also, it is within the contemplation of my invention that all of the sections as (11 and 12) of the holder may be operated singly by separate levers or simultaneously by a single lever.

Referring to Figs. 6 and 7, the cones of the stack are nested together and each cone has a ring 37 which rests upon a shoulder 38 of the cone into which it is inserted so that the tapering sides of the cone are held out of engagement. There is thus no sticking or wedging of the cones together and as soon as the lower cone 2a is released by the fork 13 it can drop freely on to the chute 22. The noses 14, because of their concentric upper surfaces, pass under and into engagement with the top of the cone 2b without any crushing effect. When ice cream cones without the nesting ring 37, or other equivalent means to prevent their wedging together, are used in my dispenser, the cones will have a tendency to stick together so that the bottom cone 2a may not drop off by its own weight, but may "hang up" on the cone 2b. The top of the bottom cone 2a, in case it sticks to cone 2b, is engaged by the points 25 of the noses 14 which positively forces the cone 2a downward and away from cone 2b, so that it must drop to the delivery chute. Thus the noses 14 have a dual function, namely, to support the stack above the bottom cone and to permit positive delivery of the bottom cone by gravity. This is clearly shown in Figs. 2, 3, 6 and 7. The cones are therefore positively delivered from the dispenser and there is no side pressure or crushing effect on the stack of cones at any point in their passage through the dispenser.

The chute or tray 22 will catch all crumbs that may drop from the stacks of cones and any foreign substances that may inadvertently get in the dispenser. This chute is removable so that it can easily be cleaned and sterilized at any time.

Having thus described one form that my invention may take, I claim all modifications and adaptations thereof that come within the scope of my claims.

I claim:

1. In a cone dispenser, the combination of a cabinet adapted to hold a vertical stack of nested cones each having an outwardly extending flange at the top, a rock shaft, a holder thereon having a fork adapted to engage the underside of the flange of the bottom cone to support the stack, means for rocking said shaft so that the fork will release the bottom cone and allow it to drop by gravity, and a pair of rounded noses on said shaft oscillatable with the tilting of said fork to engage the underside of the flange of the cone next above the bottom cone and support the stack when the bottom cone is released, said noses returning to normal position as the support is tilted reversely thereby to drop the stack on the fork, said fork and noses being spaced substantially 90° on said shaft whereby the bottom cone may drop freely when its support is removed and the stack is held by said noses.

2. A device as set forth in claim 1, having means for tilting the holder back when the bottom cone has dropped from the stack so that the fork will engage the then bottom cone and support the stack as the noses release it.

3. A device as set forth in claim 1, having means for tilting the holder back when the bottom cone has dropped from the stack so that the fork will engage the then bottom cone and support the stack as the noses release it, the cone engaging faces of said noses being curved substantially concentric with the axis of the shaft so that the stack of cones will not be raised or lowered thereby.

4. In a cone dispenser, a cabinet adapted to hold three stacks of cones, a sectional cone holder mounted in the cabinet adjacent the lower ends of the three stacks of cones, one of the sections having means for delivering one cone at a time from the bottom of one of the stacks, the other section having connected similar means for simultaneously delivering one cone from the bottom of each of the other two of said stacks, a common shaft for both delivery means, and two means for operating said sections independently as desired to deliver either one cone or two cones at a time.

5. In a cone dispenser, a cabinet adapted to hold several vertical stacks of nested cones, holding means pivotally mounted in the cabinet to oscillate on a horizontal axis at one side of the stacks including a fork for each stack extending from the holder and normally straddling the bottom cone of the stack and engaging it near the top to support the stack, two selective means for tilting the holder so that one or more forks as desired will in every case release the bottom cone from its stack and allow it to fall by gravity, and means for each stack operable upon tilting said holding means to enter between the two bottom cones of the stack or stacks selected and support the stack above the bottom cone or cones, said last mentioned means being shaped to engage the top of the bottom cone and simultaneously force it away from the cone above only should the bottom cone adhere to the cone thereabove.

FRANCIS W. TURNBULL.